US 7,558,536 B2

(12) United States Patent
Manor

(10) Patent No.: US 7,558,536 B2
(45) Date of Patent: Jul. 7, 2009

(54) ANTENNA/TRANSCEIVER CONFIGURATION IN A TRAFFIC SENSOR

(75) Inventor: Dan Manor, Ontario (CA)

(73) Assignee: EIS Electronic Integrated Systems, Inc., Toronto (CA)

( * ) Notice: Subject to any disclaimer, the term of this patent is extended or adjusted under 35 U.S.C. 154(b) by 389 days.

(21) Appl. No.: 11/182,816

(22) Filed: Jul. 18, 2005

(65) Prior Publication Data

US 2007/0015542 A1      Jan. 18, 2007

(51) Int. Cl.
*H04B 1/38* (2006.01)
(52) U.S. Cl. .................. 455/90.3; 455/550.1; 455/561; 455/73; 701/117; 701/118; 340/933; 343/700
(58) Field of Classification Search .............. 455/575.1, 455/575.8, 90.3, 550.1, 91, 128, 73, 347; 343/700; 701/117, 118; 340/933
See application file for complete search history.

(56) References Cited

U.S. PATENT DOCUMENTS

| | | | |
|---|---|---|---|
| 4,967,201 A | 10/1990 | Rich, III | |
| 4,977,406 A | 12/1990 | Tsukamoto et al. | |
| 5,161,107 A | 11/1992 | Mayeaux et al. | |
| 5,280,135 A * | 1/1994 | Berlin et al. | ................... 174/67 |
| 5,402,346 A | 3/1995 | Lion et al. | |
| 5,423,080 A | 6/1995 | Perret et al. | |
| 5,621,645 A | 4/1997 | Brady | |
| 5,663,720 A | 9/1997 | Weissman | |
| 5,694,134 A | 12/1997 | Barnes | |
| 5,793,491 A | 8/1998 | Wangler et al. | |
| 5,798,983 A | 8/1998 | Kuhn et al. | |
| 5,878,367 A | 3/1999 | Lee et al. | |
| 5,884,212 A | 3/1999 | Lion | |
| 5,920,280 A | 7/1999 | Okada et al. | |
| 5,949,383 A | 9/1999 | Hayes et al. | |
| 6,114,973 A | 9/2000 | Winner et al. | |
| 6,556,916 B2 | 4/2003 | Waite et al. | |
| 6,577,269 B2 | 6/2003 | Woodington et al. | |
| 6,693,557 B2 | 2/2004 | Arnold et al. | |
| 6,750,787 B2 | 6/2004 | Hutchinson | |
| 6,906,668 B2 | 6/2005 | Rawnick et al. | |
| 2002/0011953 A1 * | 1/2002 | Reece et al. | .......... 343/700 MS |

(Continued)

OTHER PUBLICATIONS

International Searching Authority, Written Opinion of the International Searching Authority, Nov. 7, 2006.

(Continued)

*Primary Examiner*—Tuan A Pham
(74) *Attorney, Agent, or Firm*—Bereskin & Parr LLP/S.E.N.C.R.L., s.r.l.

(57) ABSTRACT

A sensor for obtaining vehicular traffic data is described. The sensor includes a housing having a front surface. The sensor also includes an antenna plate having an antenna ground surface and a radiating surface. The antenna plate is disposed within the housing for transmitting radiation to a vehicle through the front surface and for receiving the radiation reflected back from the vehicle through the front surface. A transceiver circuit plate is disposed within the housing for electrically driving the antenna plate. The transceiver circuit plate has a component side for supporting circuit components and a circuit ground side for grounding the circuit components. The antenna ground surface is between the radiating surface and the transceiver circuit plate. A processor unit drives and processes electrical signals from the transceiver circuit plate to obtain vehicular traffic data.

18 Claims, 10 Drawing Sheets

U.S. PATENT DOCUMENTS

| | | | |
|---|---|---|---|
| 2003/0060969 A1* | 3/2003 | Waite et al. | 701/117 |
| 2004/0135703 A1* | 7/2004 | Arnold et al. | 340/933 |
| 2005/0239418 A1* | 10/2005 | Koh et al. | 455/90.3 |
| 2006/0054335 A1* | 3/2006 | Rapp et al. | 174/48 |
| 2006/0267831 A1* | 11/2006 | Tevs et al. | 342/104 |
| 2007/0085750 A1* | 4/2007 | De Angelis | 343/767 |

OTHER PUBLICATIONS

RTMS User Manual Issue 3.2 by EIS, describing the configuration of a traffic sensor currently in production by EIS—TRMS model X3—Publication date Apr. 2004.

A Photo Showing the RTMS model X3 from inside—Release date Sep. 2003.

SmarTek Acoustic Sensor Version 1 Installation and Setup Guide Jul. 25, 2000.

RTMS User Manual Issue 3.2 by EIS, describing the automatic set up and lane configuration pp. 9-13—Publication date Apr. 2004.

Berka S., Kent Lall B. and Fellow, ASCR: "New Perspectives for ATMS: Advanced Technologies in Traffic Detection"—Journal of Transportation Engineering, Jan./Feb. 1998.

Kim I.S., Jeong K., Kwon Jeong J.: "Two Novel Radar Vehicle Detectors for the Replacement of a Conventional Loop Detector"—Microwave Journal, vol. 44, No. 7, Jul. 2001, pp. 22, 26-28, 32, 35, 38, 40.

Krämer G.: "Envisioning a Radar-Based Automatic Road Transportation System"—Intelligent Transportation Systems, May/Jun. 2001, pp. 75-77.

Dailey D.J.: "A Statistical Algorithm for Estimating Speed from Single Loop Volume and Occupancy Measurements", Transportation Research Board, Part B33 (1999), pp. 133-136.

Stewart B.D., Reading I., Thomson, M.S., Binnie T.D., Dickinson K.W., Wan C.L.: "Adaptive Lane Finding In Road Traffic Image Analysis"—Road Traffic Monitoring and Control, Apr. 26-28, 1994, Conference Publication No. 391, IEE, 1994.

Smith R.L., Arnold D.V.; "Development of a Low Cost, FM/CW Transmitter for Remote Sensing"—Vehicle Detector Workshop TexITE Jun. 2000.

Unknown; "RTMS Radar Traffic Detection—General Information", EIS Integrated Sysems Inc., Jul. 21, 2001, pp. 1-6.

Lion D.; "Radar for Automatic Incident Detection and Traffic Analysis: The Beatrics Sensors"—Proceedings of the First World Congress on Applications of Transport Telematics and Intelligent Vehicle-Highway Systems 1995 ERTICO, pp. 1285-1290.

Ma B., Lakshmanan S., Hero A.; "Road and Lane Edge Detection with Multisensor Fusion Methods"—0-7803-5467-2/99 1999 IEEE.

Gern A., Franke U.; "Advanced Lane Recognition—Fusing Vision and Radar"—Proceedings of the IEEE Intelligent Vehicles Symposium 2000, Oct. 3-5, 2000, pp. 45-51.

Gonzalez J.P., Ozguner, U.; "Lane Detection Using Histogram-Based Segmentation and Decision Trees"—2000 IEEE Intelligent Transportation System Conference Proceedings, Oct. 1-3, 2000, pp. 346-351.

Unknown; "Task Force L Final Report"—Executive Summary, pp. 1-40, Jan. 16, 2002.

Unknown; "Sensors"—Transportation Operations Group, Vehicle Detection Workshop, Tex/TE Jun. 2000, pp. 1 of 13, 2 of 13, 11, 12.

Unknown; "RTMS Traffic Detector Primer"—EIS Electronic Integrated Systems Inc. Jul. 21, 2001, pp. 1-4.

Beard J.C. and Arnold D.V.; "6GHz Range Finder Using Pulse Compression"—IGARSS 2000.

Derneryd A.G.; "Linearly Polarized Microstrip Antennas"—IEEE Transactions on Antennas and Propagation, Nov. 1976, pp. 846-851.

Kranig J., Minge, E. Jones C.; "Field Test of Monitoring of Urban Vehicle Operations Using Non-Intrusive Technologies"—Final Report—FHWA-PL-97-018, Part IV—Department of Transportation Federal Highway Administration, May 1997.

Middleton D. and Parker R.; "Initial Evaluation of Selected Detectors to Replace Inductive Loops on Freeways"—Report 1439-7—Apr. 2000.

Unknown; "Detection Technology: for IVHS—vol. 1: Final Report Addendum" Publication No. FHWA-RD-96-100, Publication Date: Jul. 1995 (§ 12).

SmarTek Acoustic Sensor—Version 1 (SAS-1)—Installation and Setup Guide, Jul. 25, 2005.

Unknown: "On-Bench Photographs of Detectors"—pp. 1-9, Jan. 16, 2002.

* cited by examiner

FIG. 5A
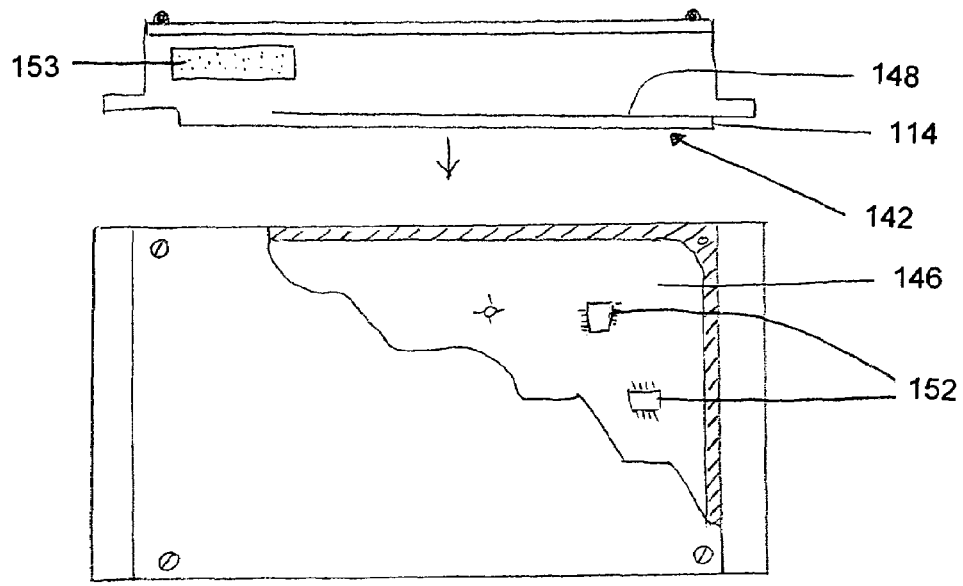
FIG. 5B
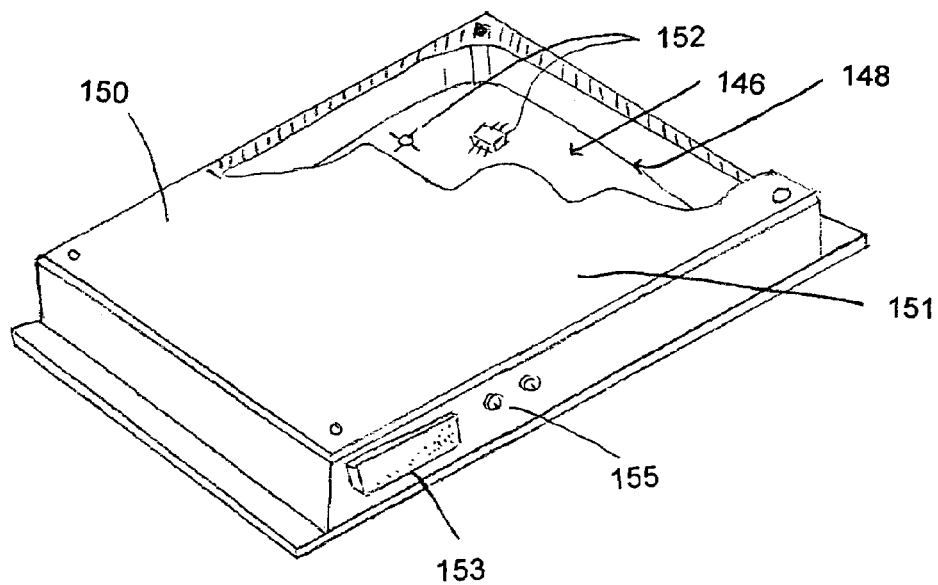
FIG. 5C

ANTENNA/TRANSCEIVER CONFIGURATION IN A TRAFFIC SENSOR

FIELD OF THE INVENTION

This invention relates to a traffic sensor, and more specifically to an antenna/transceiver configuration in a traffic sensor.

BACKGROUND OF THE INVENTION

As urban centers increase in size, and traffic congestion becomes more common, the need for accurate and up-to-date traffic information also increases. Traffic surveillance relies primarily on traffic sensors, such as inductive loop traffic sensors that are installed under the pavement. Alternatively, video sensors may also be used to obtain traffic information.

Residing underground, inductive loop sensors are expensive to install, replace and repair because of the associated roadwork required. Moreover, such roadwork also causes traffic disruptions. Video sensors, on the other hand, are cheaper, but have other drawbacks, such as an inability to operate in the dark or in weather that impairs visibility, such as fog or snow.

To overcome these drawbacks, radar sensors have been employed to obtain traffic information. Radar sensors typically transmit low-power microwave signals at the traffic, and detect vehicles based on the reflected signals. Radar sensors are generally cheaper than inductive loop traffic sensors, and, unlike video sensors, operate well in the dark and in a wide range of weather conditions.

For convenience and cost effectiveness, it is desirable that radar sensors be capable of operating in the field for many years without requiring maintenance. Thus, there is a need for radar sensors for obtaining traffic information that can function for extended periods of time outdoors, with little servicing.

SUMMARY OF THE INVENTION

It is an object of the present invention to provide an improved radar traffic sensor.

Described herein is such a traffic sensor for obtaining vehicular traffic data. The sensor includes a housing having a front surface. An antenna plate is disposed within the housing for transmitting radiation to a vehicle through the front surface and for receiving the radiation reflected back from the vehicle through the front surface. The antenna plate has an antenna ground surface and a radiating surface. The front surface of the housing is substantially planar and substantially parallel to the radiating surface of the antenna plate.

A transceiver circuit plate is disposed within the housing for electrically driving the antenna plate. The transceiver circuit plate has a component side for supporting circuit components and a circuit ground side for grounding the circuit components. The transceiver circuit plate can include a protective grounded metal case for enclosing at least a part of the component side to impede leakage of radiation from the component side. The case protects the circuit components of the component side of the transceiver circuit plate from humidity and other contaminants.

A processor unit drives the transceiver circuit plate and processes electrical signals therefrom to obtain vehicular traffic data. The antenna ground surface is between the radiating surface and the transceiver circuit plate.

BRIEF DESCRIPTION OF THE DRAWINGS

A detailed description of the preferred embodiments is provided here and below with reference to the following drawings, in which;

FIGS. 5A, 5B and 5C, in a side view, cut-away top view, and cut-away perspective view respectively, illustrate a transceiver board and a protective cover of the sensor of FIG. 1; and, FIGS. 6A and 6B show an antenna ground surface and a radiating surface, respectively, of an antenna plate of the sensor of FIG. 1.

DETAILED DESCRIPTION OF EMBODIMENTS OF THE INVENTION

Figure 1:
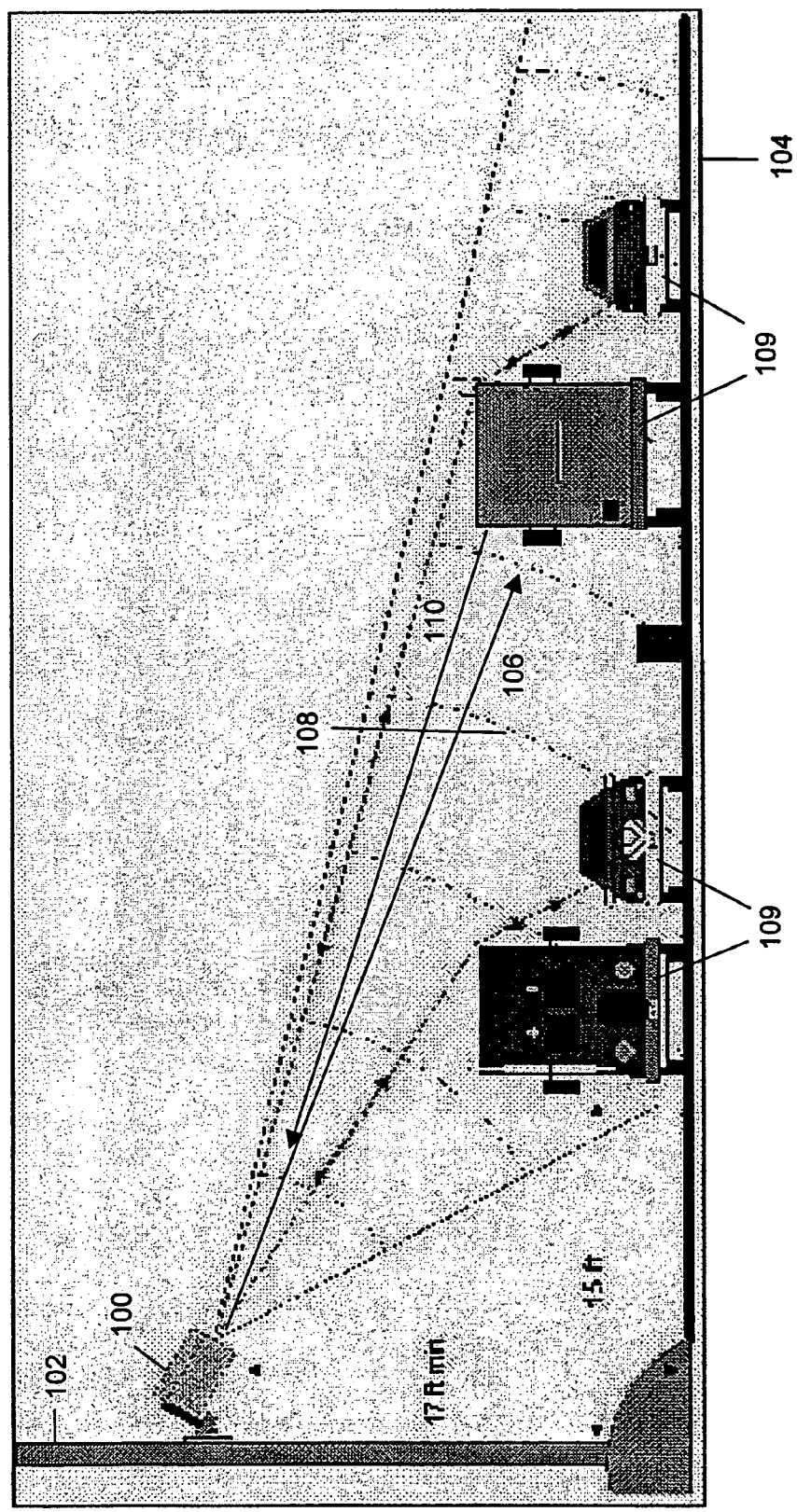
FIG. 1, in a schematic view, illustrates a traffic monitoring system in accordance with an aspect of the present invention.

Referring to FIG. 1, there is illustrated in a schematic view, a sensor 100 in accordance with a preferred aspect of the present invention. The sensor 100 is mounted on a pole 102 in a side-mounted configuration relative to road 104. Sensor 100 transmits a signal 106 through a field of view 108 at the road 104 to "paint" a long elliptical footprint on the road 104. Any non-background targets, such as vehicles 109, reflect a reflected signal Pr 110 having power level P. Specifically, the low-power microwave signal 106 transmitted by sensor 100 has a constantly varying frequency. Based on the frequency of the reflected signal 110, the sensor can determine when the original signal was transmitted, thereby determining the time elapsed and the range to the reflecting object. The range of this reflected object is the "r" in Pr.

Figure 2:
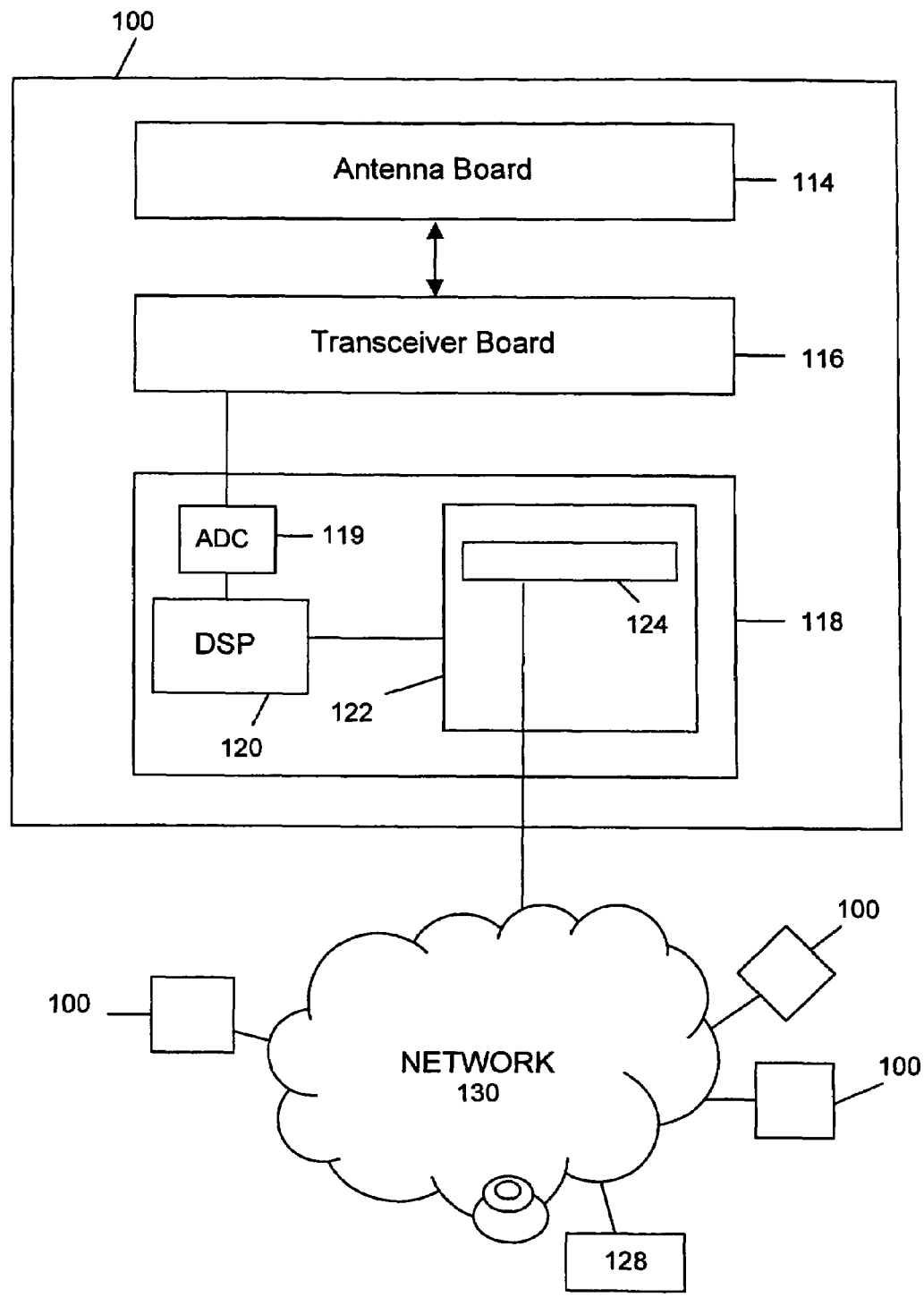
FIG. 2, in a block diagram, illustrates the traffic sensor of FIG. 1.

Referring to FIG. 2, the components of the sensor 100 are illustrated in a block diagram. As shown, the sensor 100 comprises an antenna board 114 for transmitting the signal 106 through field of view 108, and for receiving the reflected signal 110 back from the roadway. A transceiver board 116 is in electronic communication with, and drives, antenna board 114. Transceiver board 116 also receives the reflected signals from the antenna board 114, and transmits this information to a processor module 118. Preferably, processor module 118 comprises an Analog to Digital Converter (ADC) 119, a digital signal processor (DSP) chip 120 and a separate microcomputer chip 122. This microcomputer chip 122 in turn comprises an internal, non-volatile memory 124. In operation, the ADC 119 digitizes the reflected signal at specific sample times, the DSP chip 120, which is a high-speed chip, does the raw signal processing of the digitized electrical signals received from the transceiver board 116. That is, the DSP chip 120 preferably determines if a vehicle is present by determining if the stream of electrical signals received from the transceiver board 116 meets a vehicle detection criteria. The DSP chip 120 also preferably determines the range of the vehicle from the sensor. This information is then sent to the microcomputer chip 122, which configures this data for transmission to external traffic management system 128 via network 130. Microcomputer chip 122 may also collate aggregate traffic density information from this information, Optionally, the processor module 118 includes but a single DSP processor, which single DSP processor will, of necessity, have to handle the interface with external traffic management system 128 via network 130 in addition to the other tasks performed by DSP chip 120. Typically, sensor 100 will be just one of many sensors as illustrated in FIG. 2, which are connected to external traffic management system 128 via network 130.

Figure 3A:
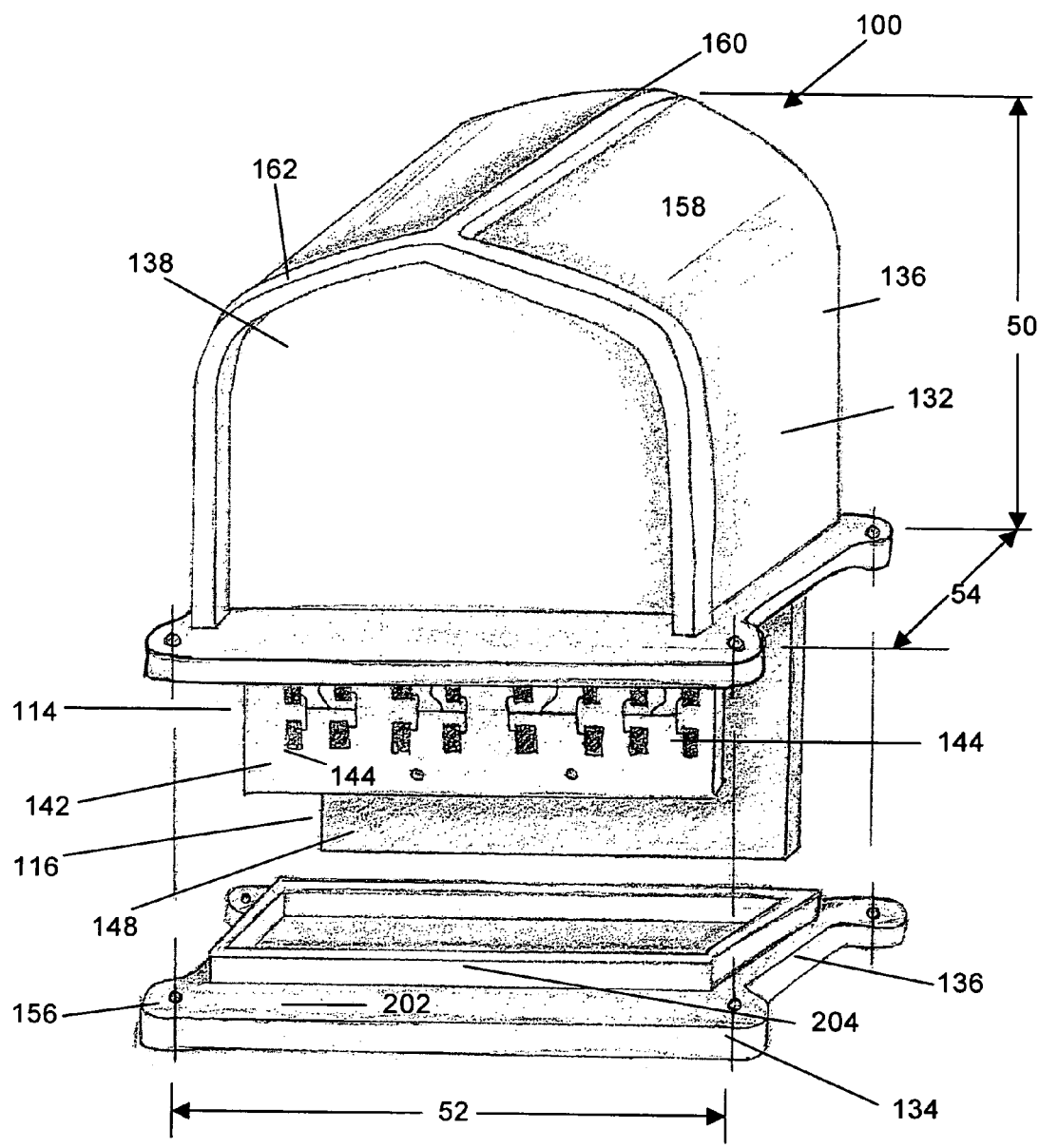
FIGS. 3A and 3B show an exploded front perspective view and rear perspective view, respectively, of the traffic sensor of FIG. 1.
Figure 3B:
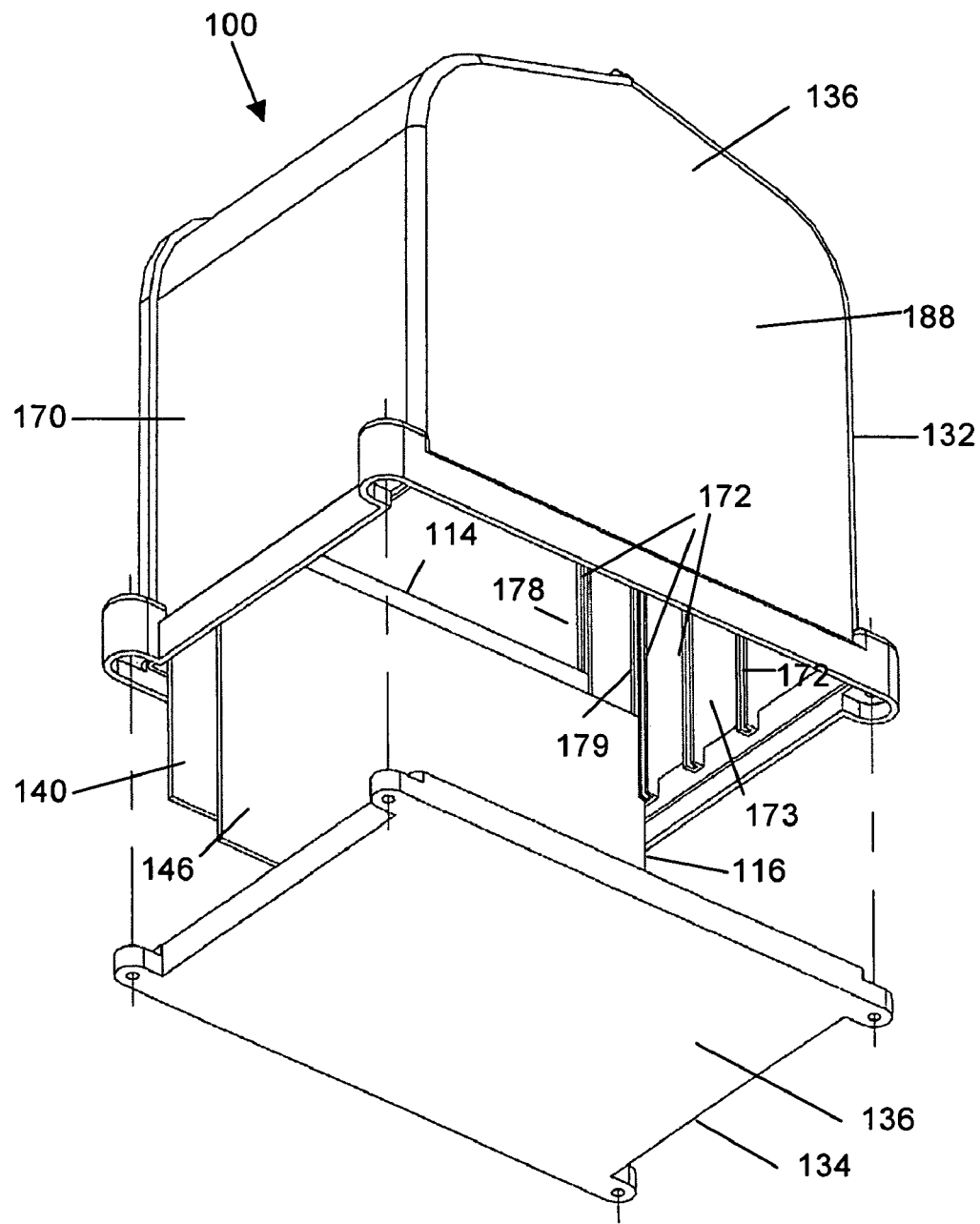

FIGS. 3A and 3B show an exploded front perspective view and rear perspective view, respectively, of the sensor 100. The sensor 100 includes a first component 132 and a second component 134 that mate to form a housing 136 having a front surface 138. The antenna board 114 and transceiver board 116 are both disposed within the housing 136. In one embodiment shown in FIGS. 5A to 5C, the antenna board 114 and the transceiver board 116 are affixed to each other. Any one of several affixing means, such as adhesive and screws, can be used for this purpose.

The antenna board 114 has an antenna ground surface 140 (shown in FIGS. 3B and 6A) and a radiating surface 142 (shown in FIGS. 3A and 6B) with antenna elements 144 thereon. The antenna elements 144 may be etched on the radiating surface 142, for example. The front surface 138 of the housing 136 is substantially planar and substantially parallel to the radiating surface 142 of the antenna board 114.

The transceiver board 116 has a component side 146 (shown in FIG. 3B and also FIGS. 5B and 5C) and a circuit ground side 148 (shown in FIG. 3A). The antenna ground surface 140 is disposed between the transceiver board 116 and the radiating surface 142. In one embodiment, the transceiver board 116 is enclosed within a protective metal case 150 (shown in FIGS. 5A-C). Optionally, the transceiver board 116 can be flipped over such that the component side 146 faces the antenna board 114

The antenna board 114 transmits radiation, for example in the microwave region, to a vehicle and receives the radiation reflected back from the vehicle through the front surface 138. In the illustrated embodiment, the antenna elements 144 (shown best in FIG. 6B) are configured to provide a single dual-function antenna for both transmitting radiation to the vehicle through the front surface 138 and for receiving the radiation reflected back from the vehicle. In other embodiments, the antenna elements 144 are configured to provide a transmitting antenna for transmitting radiation to a vehicle through the front surface 138 and a receiving antenna for receiving the radiation reflected back from the vehicle through the front surface 138. The antenna elements 144 may also be configured to provide a corporate feed array comprising a plurality of array radiating element, the plurality of array radiating element being parallel-fed.

The transceiver board 116 electrically drives the antenna board 114 at the appropriate frequency to produce radiation aimed at one or more traffic lanes. The component side 146 of the transceiver board 116 supports circuit components 152 (shown in FIGS. 5B and 5C) thereon, while the circuit ground side 148 (shown in FIG. 3A) of the transceiver board 116 grounds the circuit components 152. In one embodiment shown in FIG. 5C, the transceiver board 116 has a protective grounded metal case 150 for enclosing at least a part of the component side 146 to impede leakage of radiation from the component side 146.

The radiation transmitted by the antenna board 114 is reflected back from the vehicle and is received by the antenna board 114, which sends corresponding electrical signals to the transceiver board 116. In turn, the transceiver board 116 sends corresponding signals to the processor module 118.

As described above in connection with FIG. 2, the processor module 118 includes hardware and software for processing the electrical signals from the transceiver board 116 to obtain vehicular traffic data. In particular, the processor module 118 determines if a vehicle is present by determining if the electrical signals received from the transceiver board 116 meet vehicle detection criteria. The processor module 118 also determines the range of the vehicle from the sensor 100, as well as automatically determining traffic lane centers. Moreover, the processor module 118 can monitor the characteristics of the radiation transmitted by the antenna board 114, and correct any perturbations therein that can arise because of temperature influences on the sensor 100, for example.

Figure 4A:
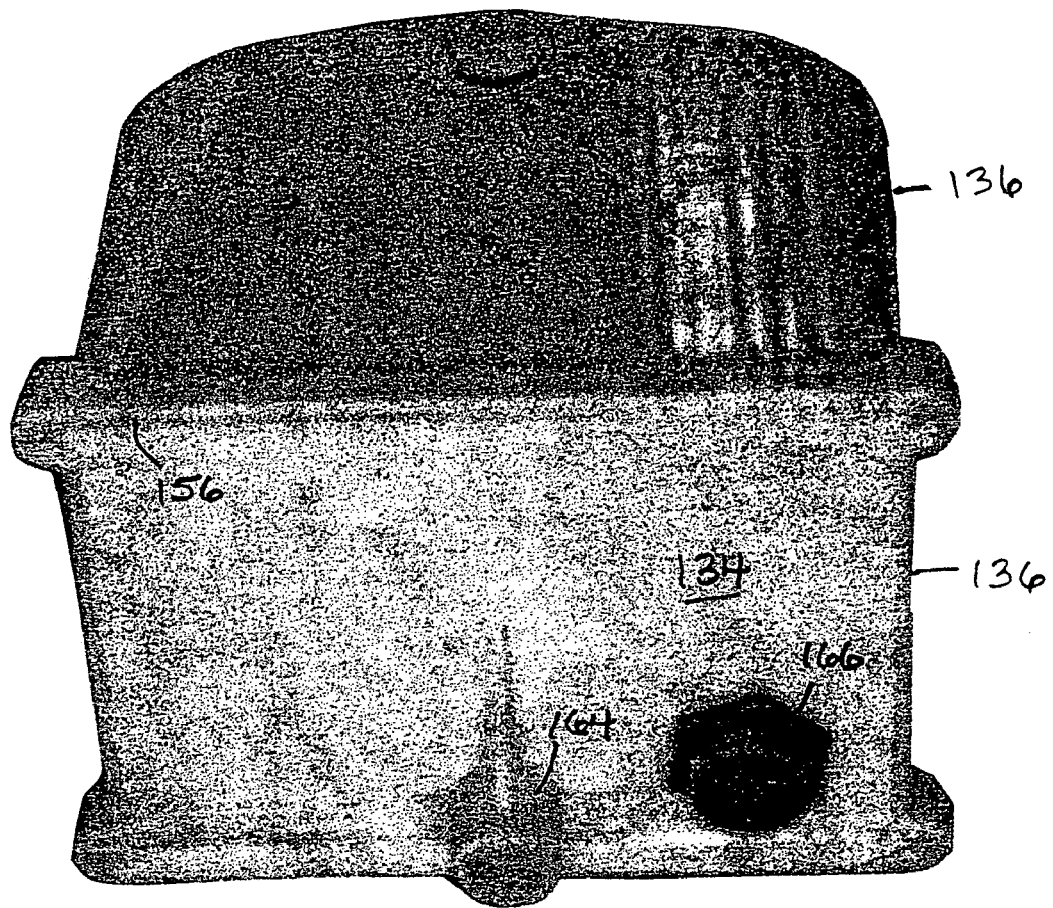
FIG. 4A is a bottom perspective view of a housing of the sensor of FIGS. 3A and 3B showing a first component and a second component of the housing.
Figure 4B:
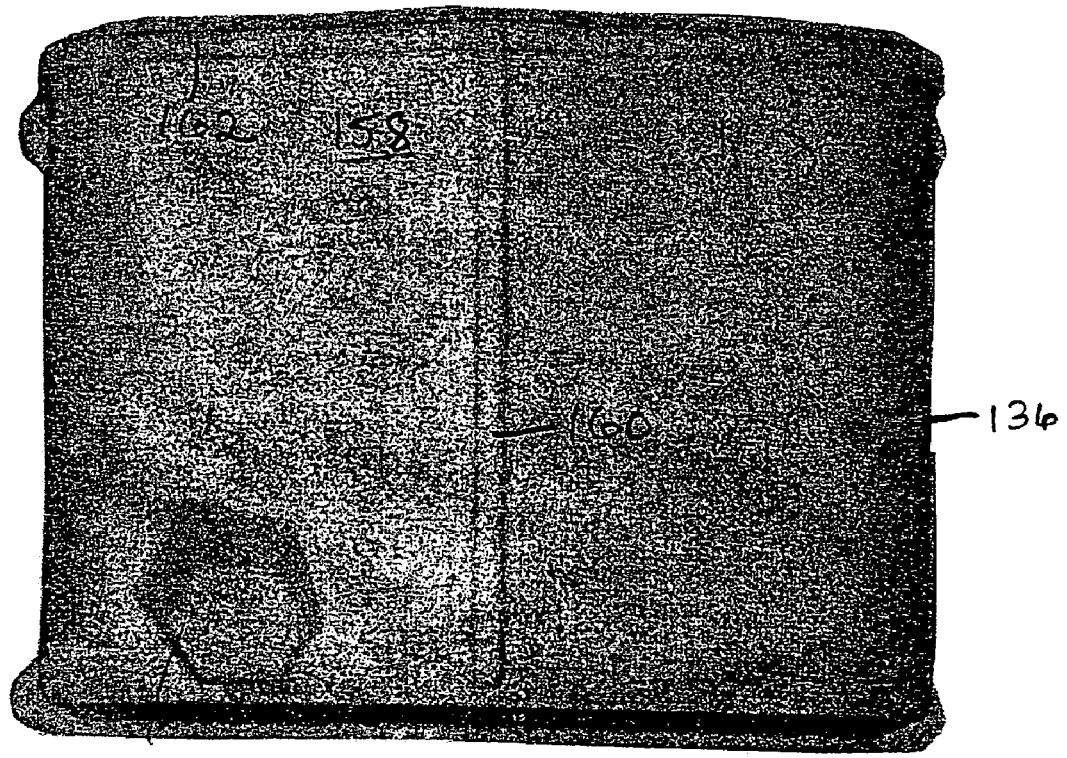
FIG. 4B is a top view of the housing of FIG. 4A.
Figure 4C:
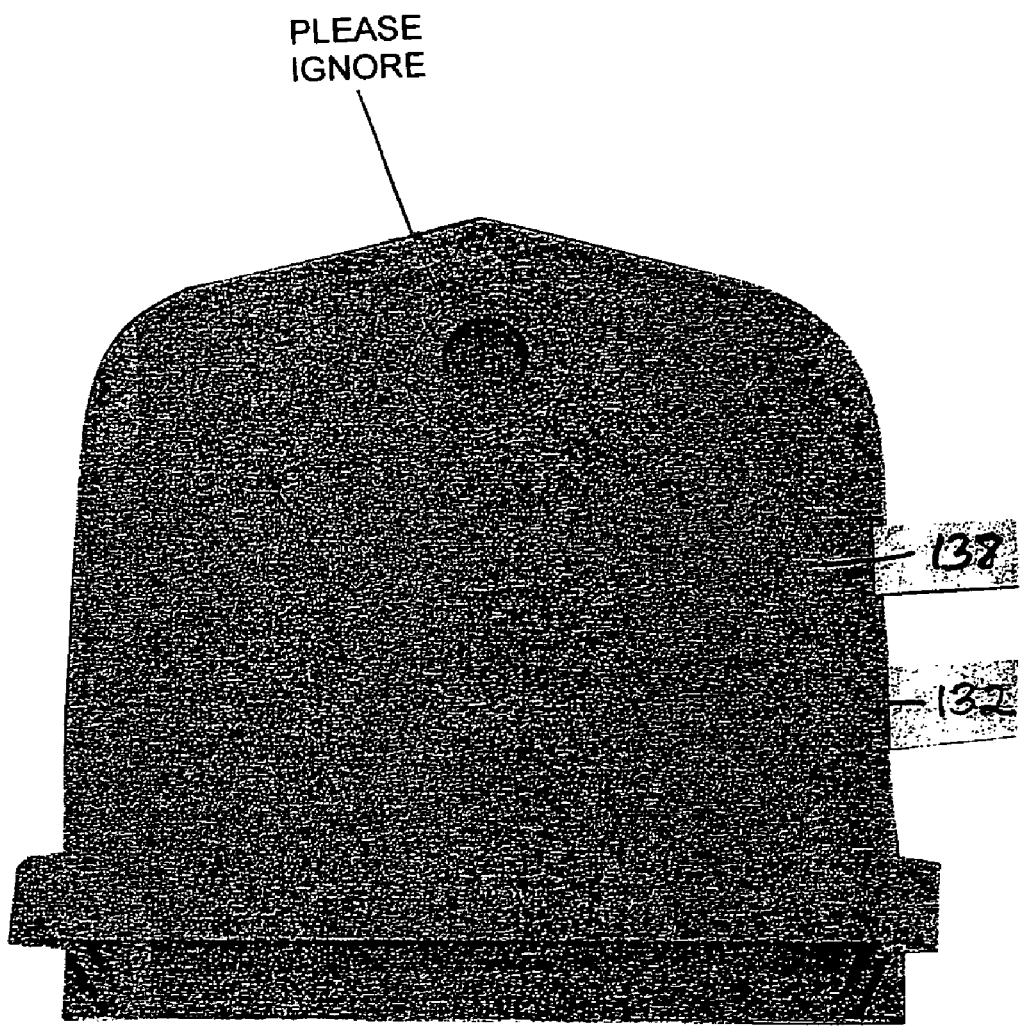
FIG. 4C is an exploded side perspective view of the housing of FIG. 4A.

FIGS. 4A-4C show various views of the housing 136 of the sensor 100 of FIGS. 3A and 3B. In particular, FIG. 4A is a bottom perspective view of the housing 136 showing the first component 132 and the second component 134 thereof. FIG. 4B is a top view of the housing 136. FIG. 4C is a side perspective view of the housing 136 with the second component 134 removed.

As described above, the front surface 138 is substantially flat, without any ledges on which ice could accumulate. The housing 136 is substantially box-shaped with a height dimension 50, a width dimension 52, and a depth dimension 54 shown in FIG. 3A. The height dimension 50 and the width dimension 52 are orthogonal to each other and substantially parallel to the radiating surface 142 of the antenna board 114. The depth dimension 54 is substantially orthogonal to the radiating surface 142 of the antenna board 114. In one embodiment, the height dimension 50 is less than twice the depth dimension 54 and the width dimension 52 is less than twice the depth dimension 54. In yet another embodiment, the height dimension 50 is less than 50% greater than the depth dimension 54, and the width dimension 52 is less than 50% greater than the depth dimension 54.

The first component 132 and the second component 134 of the housing 136 are attached together at a seal plane 156 (shown in FIGS. 3A and 4A), where the seal plane 156 is substantially perpendicular to the radiating surface 142 (shown in FIG. 3A). At least one of the first component 132 and the second component 134 may be composed of polycarbonate. The first component 132 can be attached to the second component 134 with any suitable affixing means, such as screws.

The first component 132 has a top portion 158 (shown in FIGS. 3A and 4B) that slopes downwards on either side of a center ridge 160 to permit rain to drain off the housing 136. In addition, the top portion 158 has a rain deflector 162 near the front surface 138 to direct rainwater away from the front surface 138.

The second component 134 has a support protrusion 164 (shown in FIG. 4A) that may be inserted into a mounting bracket attached to the pole 102 to support the sensor 100. The second component 134 also has a multi-pin connector 166 to attach appropriate cables (not shown) to power the sensor 100 and to allow communication between the sensor 100 and the outside world. For example, the sensor 100 can communicate with the external traffic management system 128, which also communicates with other sensors.

As shown in FIG. 3B, the housing 136 has a first side face 168 and a second side face 170 substantially parallel to the first side face 168. A first set of slots 172 are provided on an inside surface 173 of the first side face 168, while a second set of slots (not shown) are provided on an inside surface of the second side face 170. Each slot in the first set of slots 172 is disposed opposite a corresponding slot in the second set of slots. The antenna board 114 engages with a first slot 178 in the first set of slots 172 and a corresponding slot in the second set of slots. The processor board 118 is inserted into the second slot. In the embodiment shown, only two boards—the antenna board 114 and the transceiver board 116 are inserted into the first component 132 of the housing 136. However, as shown in FIG. 3B, the first set of slots 172 and the second set of slots include additional aligned pairs of slots for receiving additional boards. Thus, the first component 132 of the housing 136 has the capacity to be expanded by inserting additional board to provide additional functionality. In the event that these additional boards are inserted, of course, it will be appreciated by those of skill in the art that the antenna board 114 should be the closest board to the front surface 138 of the housing 136, such that the radiation from the radiation surface 142 is unobstructed.

FIGS. 5A, 5B and 5C, in a side view, cut-away top view, and cut-away perspective view respectively, illustrate a transceiver board and a protective cover of the sensor of FIG. 1. As shown in FIGS. 3A and 3B, the antenna ground surface 140 is disposed between the transceiver board 116 and the radiating surface 142. Put another way, the antenna board 114 and transceiver board 116 overlap, such that the cross-sectional area—the area defined by width 52 and height 50 (shown in FIG. 3A)—can be reduced.

FIGS. 5A-5C illustrate an alternative relative configuration of the antenna board 114 and transceiver board 116. That is, as shown in FIG. 5A, the antenna ground surface 140 of the antenna board can be glued or otherwise affixed to the circuit ground side 148 of the transceiver board 116. However, as shown in FIG. 5A, the antenna board 114 and transceiver board 116 still overlap in this configuration to reduce the cross-sectional area of the sensor 100.

In the embodiment shown in FIGS. 5A to 5C, the component side 146 of the transceiver board 116 has a protective grounded metal case 150 that includes a cover 151 for providing access to the circuit components 152 of the transceiver board 116. The cover 151 is attached to the metal case 150 by screws.

The protective grounded metal case 150 encloses at least a part of the component side 146 to impede leakage of radiation therefrom. In one embodiment, the protective grounded metal case 150 encloses all of the component side 146 of the transceiver board 116. The protective grounded metal case 150 is sealed to protect the circuit components 152 of the component side 146 of the transceiver board 116 from humidity and other contaminants. As shown in FIG. 5A, the metal case 150 also includes a multi-pin connector 153 and co-axial connectors 155 for linking the transceiver board 116 to the processor module 118.

By using an antenna board 114 and a transceiver board 116 that are disposed back-to-back, the height 50 and width 52 dimensions of the sensor 100 can be made smaller than the size of a differently designed sensor in which just one plate is used to support both the transceiver circuit components and antenna components.

Figure 6A:
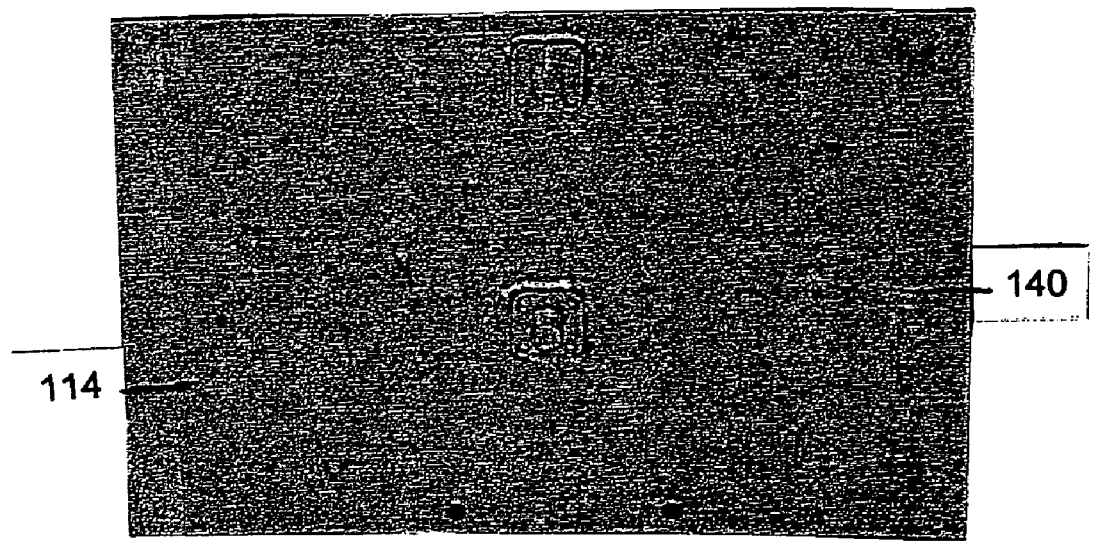
Figure 6B:
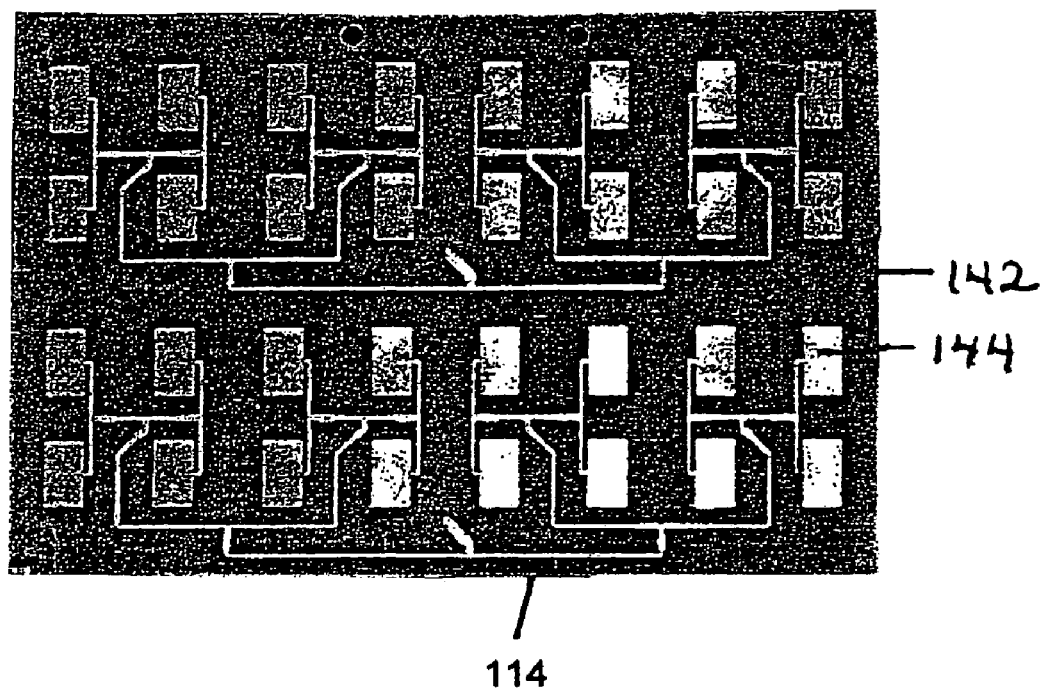

FIGS. 6A and 6B show the antenna ground surface 140 and the radiating surface 142 of the antenna board 114 of the sensor 100 shown in FIGS. 3A and 3B. The antenna board 114 includes the antenna ground surface 140 and the radiating surface 142. The radiating surface 142 has passive antenna elements 144 (shown in FIG. 6B) for transmitting and receiving radiation. The antenna elements 144 can be etched onto the radiating surface 142.

The antenna elements 144 are spread out over the radiating surface 142. Similarly, the circuit components 152 are spread out over the component side 152. By making full use of the radiating surface 142 and the component side 152, the size of the antenna board 114 and the transceiver board 116 can be made more compact than they would otherwise be.

This compact size of the antenna board 114 and the transceiver board 116 results in a number of advantages. The smaller size of the transceiver board 116 results in a corresponding smaller size of the protective grounded metal case 150. Also, because of the smaller size of the antenna board 114 and the transceiver plate 186, those sides of the housing 136 that are likely to have the greatest exposure to the elements are reduced in area. In particular, a smaller front surface 138, back surface 188 and side faces 168 and 170 reduce forces due to wind that could remove the sensor from its support.

It is also desirable that the seal plane 156 be at a significant angle—i.e. greater than, say, 70 degrees—relative to the plane of the radiating surface 142 and front surface 138. Specifically, the antenna board will typically have a slight inclination relative to the vertical plane in order to transmit signal 106 in a largely horizontal, and slightly downward direction, as shown in FIG. 1. It is important, however, that the seal plane where the first component 132 and second component 134 are joined together not be in the vertical plane as this may increase the seal plane's exposure to the elements. Accordingly, seal plane 156 can be oriented to be substantially perpendicular to the plane of the antenna board 114 such that if the antenna board is, as it typically must be, close to being vertical, the seal plane will be close to being horizontal, making it less likely that moisture will leak into the housing 136.

Referring back to FIG. 3A, seal plane 156 is defined by a seal surface 202 of the second component 134. However, seal surface 202 is not the only surface that impedes moisture from leaking into the housing 136. That is, the second component 134 also includes an inner wall defining a second sealing surface 204. Both the first sealing surface 202 and the second sealing surface 204 of the second component 134 are aligned with corresponding sealing surfaces in the first component 132 when these components are attached together, such that both the first sealing surface 202 and the second sealing surface 204 provide a seal. By this means, the second sealing surface provides additional protection against water penetration, even if some leakage occurs along the first sealing surface.

It should be understood that various modifications and adaptations could be made to the embodiments described and illustrated herein. For example, it will be appreciated by those of skill in the art that although a side-mounted configuration of the sensor 100 is shown in FIG. 1, the sensor 100 may also be mounted in other configurations, such as, for example, an overhead configuration. Accordingly, the scope of the present invention is defined in the appended claims.

The invention claimed is:

1. A sensor for obtaining vehicular traffic data, the sensor comprising:
    a housing having a front surface;
    an antenna plate disposed within the housing for transmitting radiation to a vehicle through the front surface and for receiving the radiation reflected back from the vehicle through the front surface, the antenna plate having an antenna ground surface and a radiating surface;
    a transceiver circuit plate disposed within the housing for electrically driving the antenna plate, the transceiver circuit plate having a component side for supporting circuit components and a circuit ground side for grounding the circuit components;

a processor unit for driving and processing electrical signals from the transceiver circuit plate to obtain vehicular traffic data;

wherein the antenna ground surface is between the radiating surface and the transceiver circuit plate;

wherein the housing includes a first component and a second component attached together at a seal plane, the seal plane being substantially perpendicular to the radiating surface, and wherein the first component and the second component are attached together at a first seal surface and a second seal surface, the first seal surface being substantially parallel to the seal plane, and the second seal surface being oriented at a non-zero angle relative to the seal plane.

2. The sensor of claim 1, wherein the antenna elements are etched on the antenna plate.

3. The sensor of claim 2, wherein the antenna elements are configured to provide a single dual-function antenna for both transmitting radiation to the vehicle through the front surface and for receiving the radiation reflected back from the vehicle surface.

4. The sensor of claim 2, wherein the antenna elements are configured to provide a transmitting antenna for transmitting radiation to a vehicle through the front surface, and a receiving antenna for receiving the radiation reflected back from the vehicle through the front surface.

5. The sensor of claim 1, wherein the antenna elements are configured to provide a corporate feed array comprising a plurality of array radiating element, the plurality of array radiating element being parallel-fed.

6. The sensor of claim 1, wherein the front surface of the housing is substantially planar and substantially parallel to the radiating surface of the antenna plate.

7. The sensor of claim 1, wherein the antenna plate and the transceiver circuit plate are affixed to each other.

8. The sensor of claim 1, wherein the housing is substantially box-shaped with a height dimension, a width dimension, and a depth dimension, the height dimension and the width dimension being orthogonal to each other and substantially parallel to the radiating surface of the antenna plate, and the depth dimension being substantially orthogonal to the radiating surface of the antenna plate, wherein the height dimension is less than twice the depth dimension and the width dimension is less than twice the depth dimension.

9. The sensor of claim 8, wherein the height dimension is less than 50 percent greater than the depth dimension, and the width dimension is less than 50 percent greater than the depth dimension.

10. The sensor of claim 1 wherein the non-zero angle is at least 70 degrees.

11. The sensor of claim 1, wherein the housing has a first side face and a second side face substantially parallel to the first side face, the sensor further comprising:

a first set of slots on an inside surface of the first side face; and a second set of slots on an inner surface of the second side face, each slot in the first set of slots being disposed opposite a corresponding slot in the second set of slots, wherein the antenna plate engages with a first slot in the first set and first slot in the second set.

12. The sensor of claim 1, wherein the transceiver circuit plate further comprises a protective grounded metal case for enclosing at least a part of the component side to impede leakage of radiation from the component side.

13. The sensor of claim 12, wherein the protective grounded metal case comprises a cover for providing access to the circuit components of the component side of the transceiver circuit plate.

14. The sensor of claim 12, wherein the protective grounded metal case encloses all of the component side of the transceiver circuit plate.

15. The sensor of claim 12, wherein the protective grounded metal case is sealed to protect the circuit components of the component side of the transceiver circuit plate from humidity and other contaminants.

16. The sensor of claim 1 wherein the housing comprises a top surface adjoining the front surface, and a rain deflector protruding from the housing between the front surface and the top surface to direct rainwater away from the front surface.

17. The sensor of claim 1 wherein the housing comprises a top surface and at least one side surface adjoining the front surface, the top surface being inclined toward the at least one side surface to direct rainwater toward the at least one side surface.

18. The sensor of claim 1 wherein the housing is composed of polycarbonate.

* * * * *